US012341260B2

(12) United States Patent
Huang et al.

(10) Patent No.: US 12,341,260 B2
(45) Date of Patent: Jun. 24, 2025

(54) ANTENNA DEVICE

(71) Applicant: PEGATRON CORPORATION, Taipei (TW)

(72) Inventors: Chin-Ting Huang, Taipei (TW); Hsi-Kai Hung, Taipei (TW); Sony Chayadi, Taipei (TW)

(73) Assignee: PEGATRON CORPORATION, Taipei (TW)

(*) Notice: Subject to any disclaimer, the term of this patent is extended or adjusted under 35 U.S.C. 154(b) by 169 days.

(21) Appl. No.: 18/462,047

(22) Filed: Sep. 6, 2023

(65) Prior Publication Data

US 2024/0128645 A1 Apr. 18, 2024

(30) Foreign Application Priority Data

Oct. 18, 2022 (TW) .................................. 111139504

(51) Int. Cl.
*H01Q 1/50* (2006.01)
*H01Q 5/335* (2015.01)

(52) U.S. Cl.
CPC ............... *H01Q 5/335* (2015.01); *H01Q 1/50* (2013.01)

(58) Field of Classification Search
CPC . H01Q 5/30; H01Q 5/335; H01Q 1/50; G01S 3/14; G01S 3/38; G01S 3/42
See application file for complete search history.

(56) References Cited

U.S. PATENT DOCUMENTS 11,239,572 B2 * 2/2022 Hu ......................... H01Q 21/28

FOREIGN PATENT DOCUMENTS

| | | |
|---|---|---|
| CN | 105826654 | 10/2017 |
| TW | 202130220 | 8/2021 |

* cited by examiner

*Primary Examiner* — Jimmy T Vu
(74) *Attorney, Agent, or Firm* — J.C. PATENTS

(57) ABSTRACT

An antenna device includes a body and at least one external antenna. The body includes a processor and a sensor electrically connected to the processor. The processor is configured to receive a sensing signal from the sensor. The external antenna is externally connected to the body at an adjustable angle, and includes a first antenna, a second antenna, and a switch. The switch is electrically connected to the processor, and is switchably electrically connected to the first antenna and the second antenna. When the sensor senses that the external antenna is at a first angle or a second angle relative to the body, the processor switches the switch electrically connected to the first antenna or the second antenna according to the sensing signal, so that the external antenna has a first radiation pattern or a second radiation pattern.

10 Claims, 6 Drawing Sheets

ANTENNA DEVICE

CROSS-REFERENCE TO RELATED APPLICATION

This application claims the priority benefit of Taiwan application serial no. 111139504, filed on Oct. 18, 2022. The entirety of the above-mentioned patent application is hereby incorporated by reference herein and made a part of this specification.

BACKGROUND

Technical Field

This disclosure relates to an antenna device, and in particular to an antenna device providing better reception.

Description of Related Art

The 4G/5G/Wi-Fi router is now a must-have communication network device in the home. Users will adjust the angle of the external antenna of the router to avoid dead spots in the reception, so as to achieve wide coverage and reception quality. However, when users adjust the angle of the external antenna, the reception quality will be better in some spaces and worse in others. The reason is that the traditional external antenna is designed with only one set of antennas to produce one set of radiation pattern, which is physically limited by the fact that the angle of a certain radiation pattern is concave, resulting in dead spots in the reception.

SUMMARY

The disclosure provides an antenna device that provides better reception.

The antenna device of the disclosure includes a body and at least one external antenna. The body includes a processor and a sensor electrically connected to the processor, and the processor is configured to receive a sensing signal from the sensor. The external antenna is externally connected to the body at an adjustable angle, and includes a first antenna, a second antenna, and a switch. The switch is electrically connected to the processor, and is switchably electrically connected to the first antenna and the second antenna. The first antenna has a first radiation pattern, and the second antenna has a second radiation pattern. When the sensor senses that the external antenna is at a first angle relative to the body, the processor switches the switch electrically connected to the first antenna according to the sensing signal, so that the external antenna has the first radiation pattern. When the sensor senses that the external antenna is at a second angle relative to the body, the processor switches the switch electrically connected to the second antenna according to the sensing signal, so that the external antenna has the second radiation pattern.

Based on the above, the external antenna of the antenna device of the disclosure may be externally connected to the body at an adjustable angle. The body includes a processor and a sensor electrically connected to the processor, and the processor is configured to receive a sensing signal from the sensor. The external antenna includes a first antenna, a second antenna, and a switch, and the switch is electrically connected to the processor and is switchably electrically connected to the first antenna and the second antenna. The first antenna has a first radiation pattern, and the second antenna has a second radiation pattern. When the sensor senses that the external antenna is at a first angle relative to the body, the processor switches the switch electrically connected to the first antenna according to the sensing signal, so that the external antenna has the first radiation pattern. When the sensor senses that the external antenna is at a second angle relative to the body, the processor switches the switch electrically connected to the second antenna according to the sensing signal, so that the external antenna has the second radiation pattern. Since the external antenna of the antenna device of the disclosure can be switched to different antennas according to the position relative to the body so as to provide different radiation patterns, the probability of dead spots in the reception may be effectively reduced and a better reception effect may be provided.

To make the aforementioned more comprehensive, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
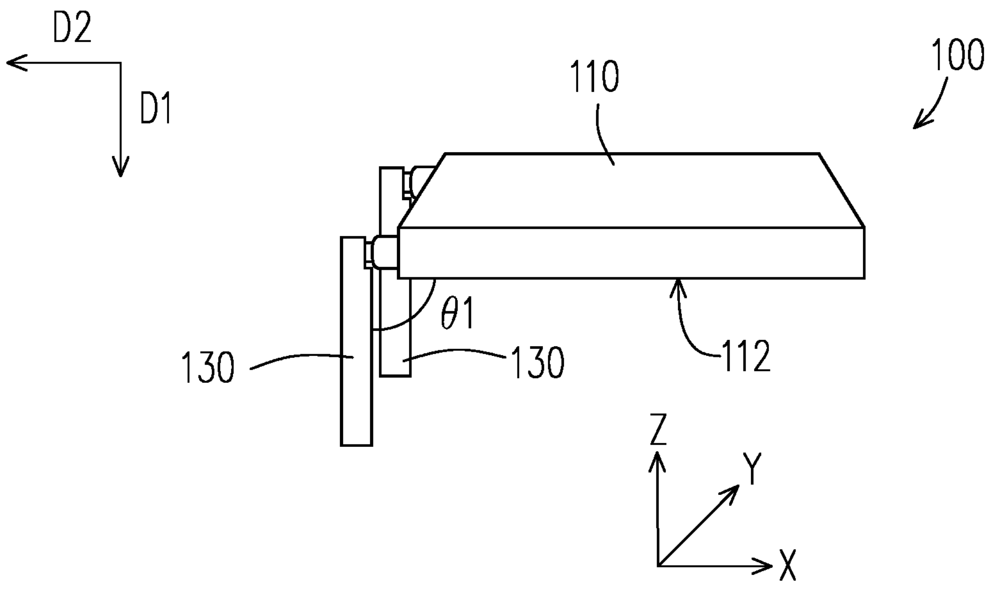
FIG. 1 is a schematic diagram of an external antenna of an antenna device at a first angle according to an embodiment of the disclosure.
Figure 2:
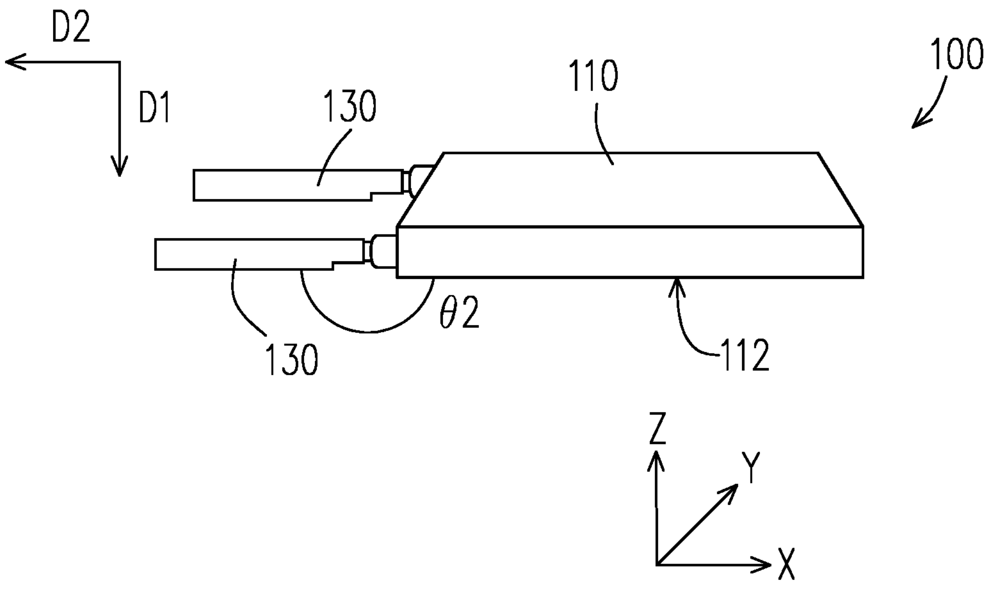
FIG. 2 is a schematic diagram of an external antenna of an antenna device at a second angle according to an embodiment of the disclosure.

FIG. 1 and FIG. 2 are schematic diagrams of an external antenna of an antenna device at a first angle and a second angle, respectively, according to an embodiment of the disclosure. Referring to FIG. 1 and FIG. 2, an antenna device 100 of this embodiment includes a body 110 and at least one external antenna 130. In this embodiment, there are, for example, two external antennas 130, but the number of the external antennas 130 is not limited thereto. In other embodiments, there may be only one or more than three external antennas 130. The external antenna 130 may be disposed on the same side of the body 110 or on different sides. A shell of the body 110 is, for example, a plastic shell or other insulating body to avoid affecting the performance of the antenna.

In this embodiment, the body 110 of the antenna device 100 is optionally installed on a ceiling (not shown), and a bottom surface 112 of the body 110 is, for example, parallel to the ceiling. It can be seen from FIG. 1 and FIG. 2 that each external antenna 130 is externally connected to the body 110 at an adjustable angle. As shown in FIG. 1, the external antenna 130 may be at a first angle θ1 relative to the body 110, and the first angle θ1 is, for example, an angle as the external antenna 130 is perpendicular to the bottom surface 112 of the body 110. For example, the first angle θ1 is 90 degrees, in which the external antenna 130 extends in a direction of gravity D1 (i.e., −Z direction in the X, Y, Z axes of FIG. 1), but the first angle θ1 of the external antenna 130 is not limited in this way.

As shown in FIG. 2, the external antenna 130 may also be at a second angle θ2 relative to the body 110, and the second angle θ2 is, for example, an angle as the external antenna 130 is parallel to the bottom surface 112 of the body 110. For example, the second angle θ2 is 180 degrees, in which the external antenna 130 extends in a horizontal direction D2 perpendicular to direction of gravity D1 (i.e., −X direction in the X, Y, Z axes of FIG. 1), but the second angle θ2 of the external antenna 130 is not limited in this way.

In addition, in FIG. 1 and FIG. 2, the angles of the two external antennas 130 are the same, but in other embodiments, the angles of the two external antennas 130 may also be different.

Figure 3:
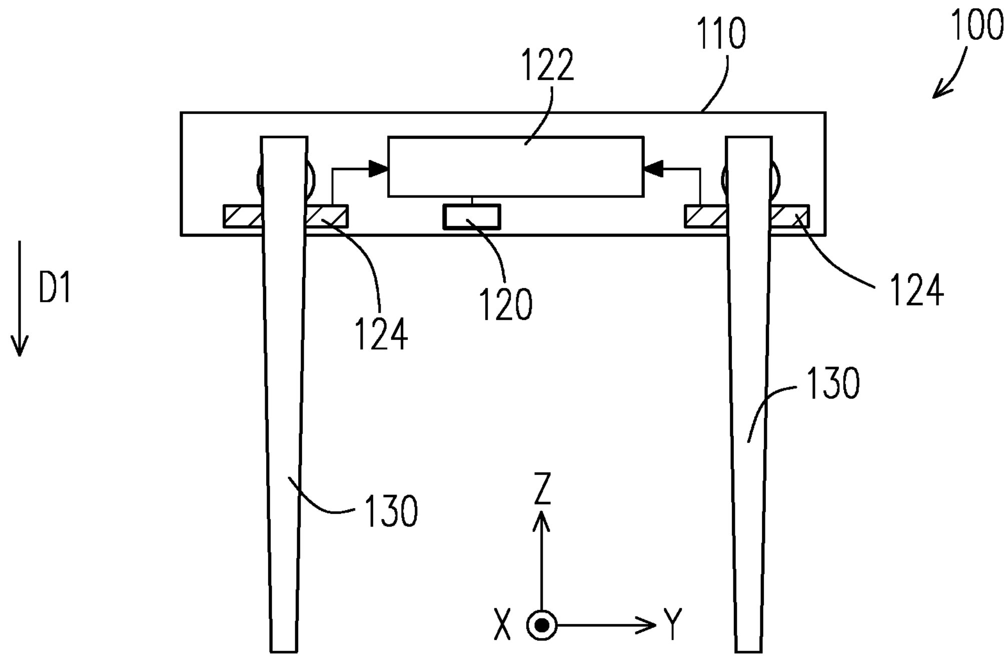
FIG. 3 is a schematic diagram of a position of the external antenna at the first angle in FIG. 1 in relation to a sensing pad.
Figure 4:
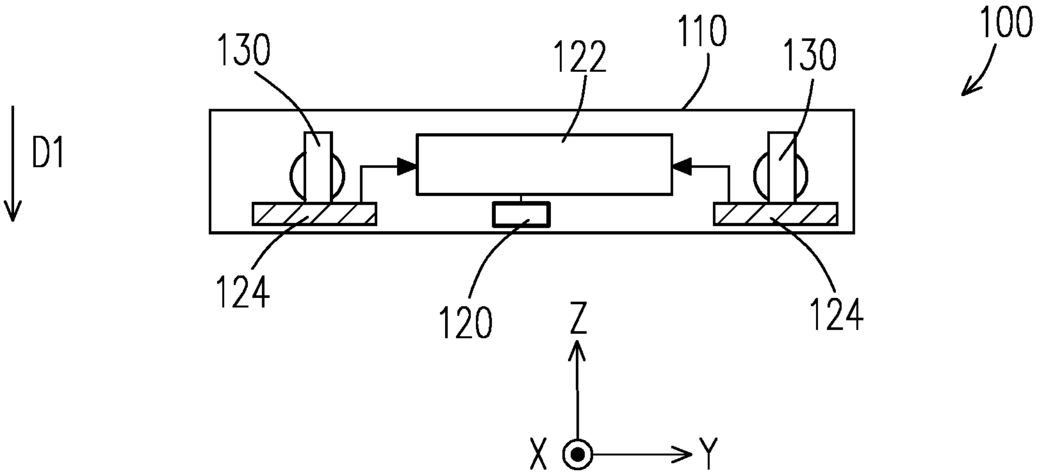
FIG. 4 is a schematic diagram of a position of the external antenna at the second angle in FIG. 2 in relation to a sensing pad.

FIG. 3 is a schematic diagram of a position of the external antenna at the first angle in FIG. 1 in relation to a sensing pad. FIG. 4 is a schematic diagram of a position of the external antenna at the second angle in FIG. 2 in relation to a sensing pad. It should be noted that FIG. 3 and FIG. 4 show the viewpoints from the left to the right of FIG. 1 and FIG. 2.

Referring to FIG. 3 and FIG. 4, in this embodiment, the body 110 includes a processor 120 and a sensor 122 electrically connected to the processor 120. The sensor 122 senses the position of the corresponding external antenna 130 relative to the body 110 and transmits a sensing result to the processor 120, the processor 120 may then determine an angle of the external antenna 130 relative to the body 110.

In this embodiment, the sensor 122 is a capacitive proximity sensor 122. The body 110 also includes at least one sensing pad 124 near the at least one external antenna 130. Each sensing pad 124 is electrically connected to the proximity sensor 122. The sensing pad 124 and the sensor 122 (the capacitive proximity sensor) are configured to obtain a capacitive signal of the external antenna 130. In this embodiment, a number of the sensing pad 124 is two, and the two sensing pads 124 correspond to the two external antennas 130 respectively to sense an angle of placement of the external antenna 130 relative to the body 110. It should be noted that the first angle θ1 is not limited to 90 degrees, as long as the angle of placement of the external antenna 130 is sensed by the sensing pad 124, it is within the scope to be protected by the disclosure.

Specifically, as shown in FIG. 1 and FIG. 3, when the two external antennas 130 are at the first angle θ1 relative to the body 110, for example, the first angle θ1 is 90 degrees, a gap between the two external antennas 130 and the two sensing pads 124 generates a corresponding capacitive signal. The smaller the gap, the higher the capacitance value, and the capacitive signal is transmitted to the sensor 122 (e.g., a capacitive proximity sensing circuit), and then is transmitted to the processor 120. Thus, the processor 120 may determine that the external antenna 130 is at the first angle θ1 relative to the body 110.

As shown in FIG. 2 and FIG. 4, when the two external antennas 130 are at the second angle θ2 relative to the body 110, for example, the second angle θ2 is 180 degrees, the two external antennas 130 are not near the two sensing pads 124, and thus the capacitive signal sensed by the sensors 122 is zero. Thus, the processor 120 may determine that the external antenna 130 is at the second angle θ2 relative to the body 110 according to the capacitive signal. It should be noted that the second angle θ2 is not limited to 180 degrees, as long as the angle of placement of the external antenna 130 is sensed by the sensing pad 124, it is within the scope to be protected by the disclosure.

Figure 5:
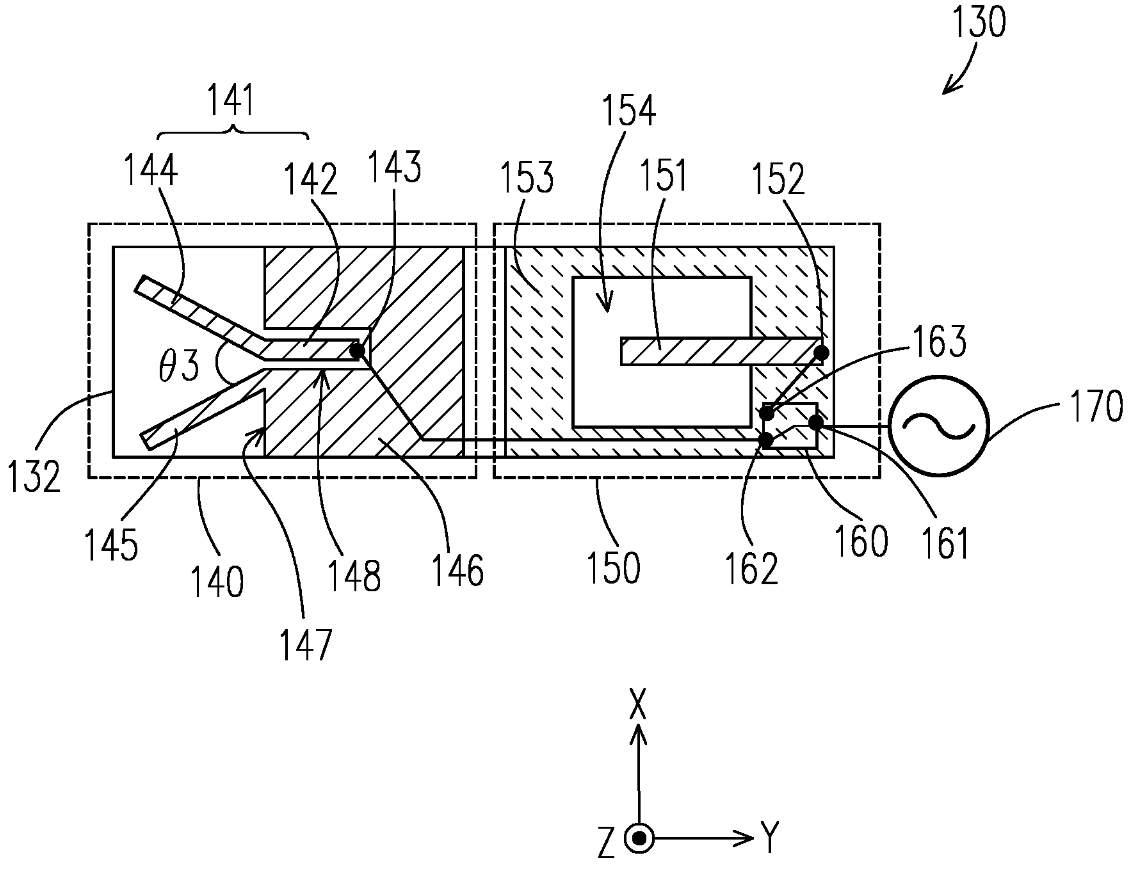
FIG. 5 is a schematic diagram of the interior of an external antenna.

FIG. 5 is a schematic diagram of the interior of an external antenna. Referring to FIG. 5, in this embodiment, each of the external antenna 130 includes a first antenna 140, a second antenna 150, and a switch 160. The external antenna 130 also includes a substrate 132, the substrate 132 is disposed in the external antenna 130, and the first antenna 140, the second antenna 150, and the switch 160 are disposed on the substrate 132.

In this embodiment, the first antenna 140 is, for example, a dipole antenna, and the second antenna 150 is, for example, a slot antenna. Of course, the types of the first antenna 140 and the second antenna 150 are not limited to the above. In other embodiments, the first antenna 140 and the second antenna 150 may be two of a PIFA antenna, a slot antenna, a patch antenna, a dipole antenna, and a monopole antenna.

In this embodiment, the first antenna 140 and the second antenna 150 are of different types, but excite the same frequency band. This frequency band is, for example, between 3.3 GHz and 3.8 GHz, but the frequency band is not limited thereto.

The switch 160 is switchably electrically connected to the first antenna 140 and the second antenna 150. In this embodiment, the switch 160 includes a first port 161, a second port 162, and a third port 163. The first port 161 is electrically connected to a signal source 170, the second port 162 is electrically connected to the first antenna 140, and the second port 162 is electrically connected to the second antenna 150 to optionally feed the signal to the first antenna 140 or the second antenna 150. In addition, the processor 120 of the body 110 is electrically connected to the switch 160, and thus, the processor 120 may instruct the switch 160 to switch to the first antenna 140 or the second antenna 150 according to the angle of placement of the external antenna 130 relative to the body 110, so that the first antenna 140 or the second antenna 150 generates the first radiation pattern or the second radiation pattern respectively.

Specifically, when the external antenna 130 is at the first angle θ1 relative to the body 110 (as shown in FIG. 1), the processor 120 instructs the switch 160 to switch so that the first port 161 is connected to the second port 162, and to connect to the first antenna 140 so that the first antenna 140 is electrically connected to the signal source 170 in the body 110. When the external antenna 130 is at the second angle θ2 relative to the body 110 (as shown in FIG. 2), the processor 120 instructs the switch 160 to switch so that the first port 161 is connected to the third port 163, and to connect to the second antenna 150 so that the second antenna 150 is electrically connected to the signal source 170 in the body 110.

Since the types of the first antenna 140 and the second antenna 150 are different, and the first radiation pattern of the first antenna is different from the second radiation pattern of the second antenna, the processor 120 may whether to switch to the first antenna 140 or the second antenna 150 depending on the angle of the external antenna 130 relative to the body 110, in order to provide an appropriate radiation pattern for the external antenna 130 at the angle, thereby reducing the probability of the dead spots in the reception.

More specifically, if the antenna device 100 is installed on the ceiling, the main receiving location will be below the antenna device 100. The designer uses the antenna with a good radiation pattern below the body 110 as the first antenna 140 when the external antenna 130 is at the first angle θ1 relative to the body 110, and uses the antenna with a good radiation pattern below the body 110 as the second antenna 150 when the external antenna 130 is at the second angle θ2 relative to the body 110, so as to ensure that there is a good reception effect below the body 110, and that there can be a good reception effect for different locations through different antennas.

In this embodiment, the first antenna 140 includes a first radiator 141, a second radiator 145, and a first ground plane 146. The first ground plane 146 includes an edge 147 and a notch 148 recessed in the edge 147. The first radiator 141 includes a first section 142 and a second section 144, and the first section 142 is located in the notch 148 and includes a first feed-in end 143. The first feed-in end 143 is electrically connected to the second port 162 of the switch 160. The second radiator 145 is connected to the edge 147 of the first ground plane 146, and an angle θ3 between the second section 144 and the second radiator 145 is between 30 degrees and 60 degrees, for example, 45 degrees. That is, the first antenna 140 is a 45-degree open-angle dipole antenna.

In addition, the second antenna 150 includes a third radiator 151 and a second ground plane 153 that are not coplanar, the third radiator 151 being disposed, for example, on an upper surface of the substrate 132 and the second ground plane 153 being disposed, for example, on a lower surface of the substrate 132. The second ground plane 153 includes an internal hole 154, the third radiator 151 includes a second feed-in end 152, and the second feed-in end 152 is electrically connected to the third port 163 of the switch 160. Projection of the third radiator 151 onto a plane of the second ground plane 153 spans from the second ground plane 153 to the internal hole 154. Of course, the pattern of the first antenna 140 and the second antenna 150 are not limited thereto.

Figure 6:
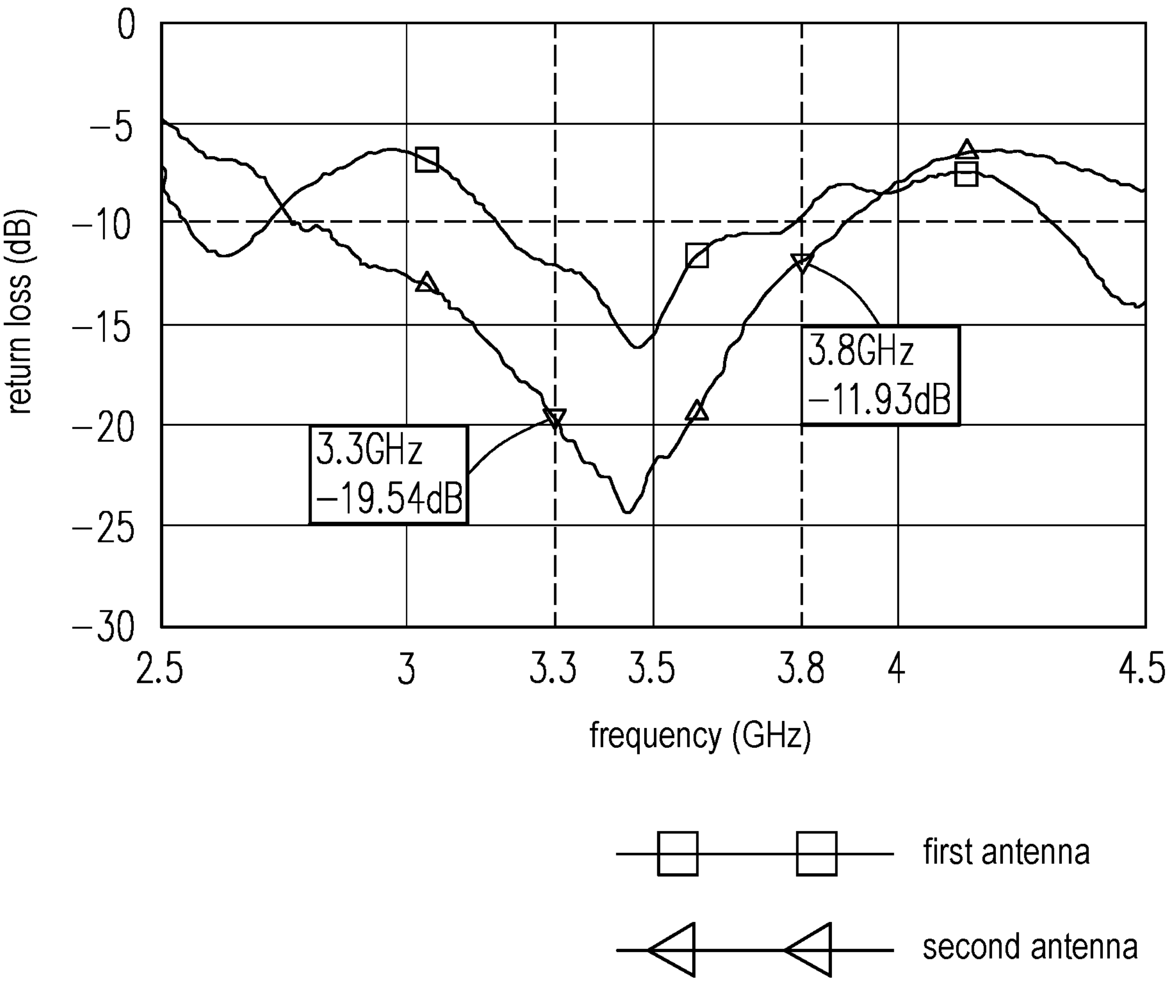
FIG. 6 is a frequency-return loss diagram of an external antenna at a first angle.

FIG. 6 is a frequency-return loss diagram of an external antenna at a first angle. Referring to FIG. 6, when the external antenna 130 is at the first angle θ1 relative to the body 110, for example, the first angle θ1 is 90 degrees, the switch 160 switches to the first antenna 140, and with an input impedance bandwidth based on a standard of a VSWR of 2:1 or a return loss of −10 dB, the first antenna 140 has a good performance at the operating frequency of the impedance bandwidth covering the required bandwidth for the communication frequency band of the 5G n78 system (3300 to 3800 MHz). In addition, after measurement, the first antenna 140 has an antenna efficiency of 66% at the center frequency of 3550 MHz in the 5G n78 system communication frequency band (3300 to 3800 MHz), which has a good performance.

When the external antenna 130 is at the second angle θ2 relative to the body 110, for example, the second angle θ2 is 180 degrees, the switch 160 switches to the second antenna 150, and with an input impedance bandwidth based on a standard of a VSWR of 2:1 or a return loss of −10 dB, the second antenna 150 has a good performance at the operating frequency of the impedance bandwidth covering the required bandwidth for the communication frequency band of the 5G n78 system (3300 to 3800 MHz). In addition, after measurement, the second antenna 150 has an antenna efficiency of 78% at the center frequency of 3550 MHz in the 5G n78 system communication frequency band (3300 to 3800 MHz), which has a good performance.

Figure 7A:
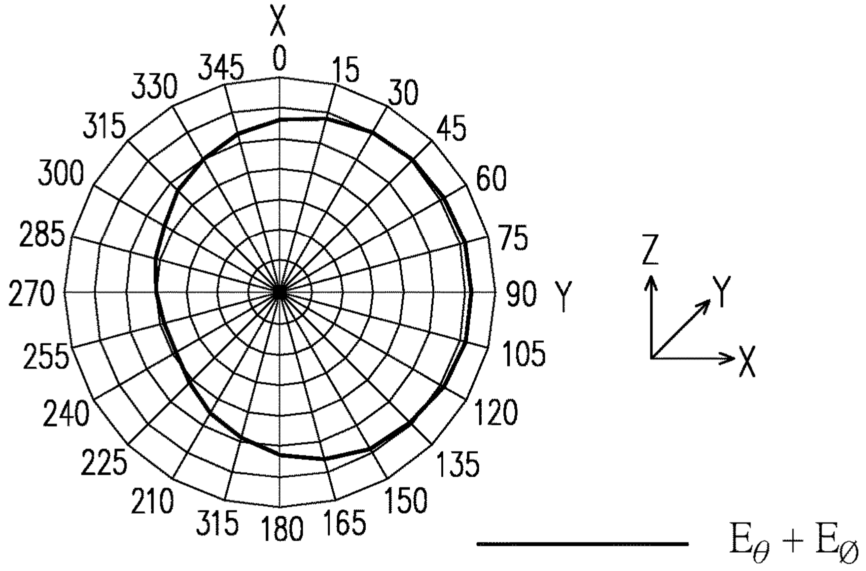
FIG. 7A to FIG. 7C are radiation pattern diagrams of a first antenna in FIG. 5 in different planes.
Figure 7B:
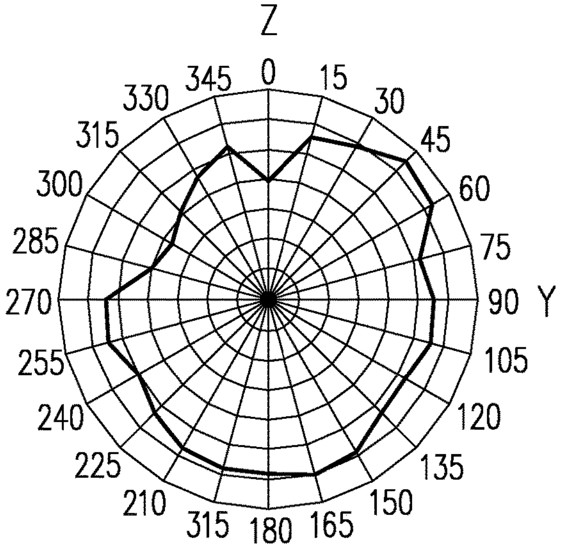
Figure 7C:
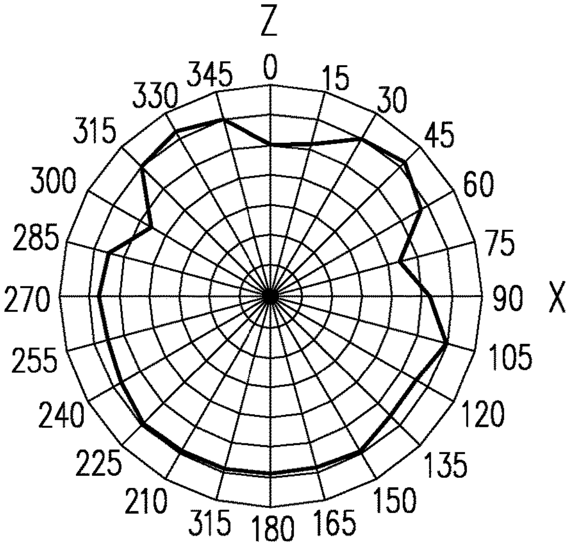

FIG. 7A to FIG. 7C are radiation pattern diagrams of a first antenna in FIG. 5 in different planes. Referring to FIG. 7A to FIG. 7C, in the two-dimensional radiation pattern on the ZY plane in FIG. 7B, radiation energy EΦ+Eθ is directed from 90 degrees to 270 degrees. In the two-dimensional radiation pattern on the ZX plane in FIG. 7C, the radiation energy EΦ-Eθ is directed from 90 degrees to 270 degrees. Therefore, when the antenna device 100 is disposed on the ceiling, the user may get good communication quality under the ceiling.

Figure 8A:
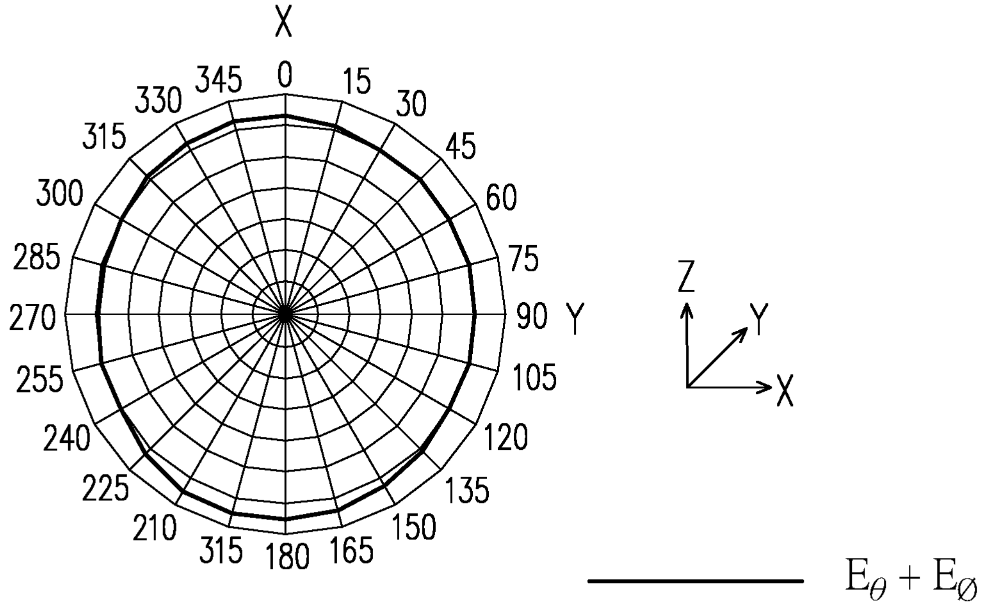
FIG. 8A to FIG. 8C are radiation pattern diagrams of a second antenna in FIG. 5 in different planes.
Figure 8B:
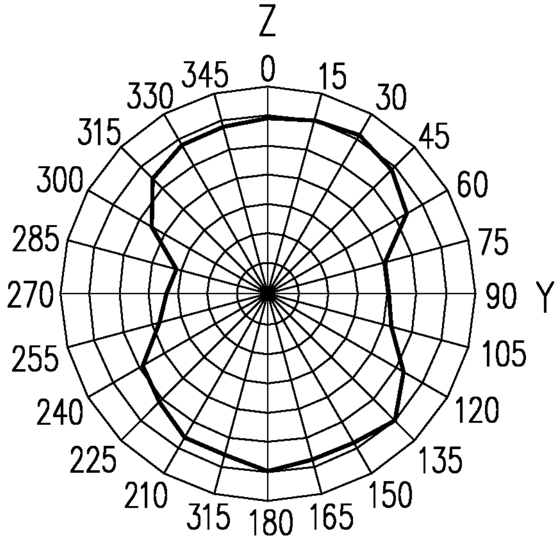
Figure 8C:
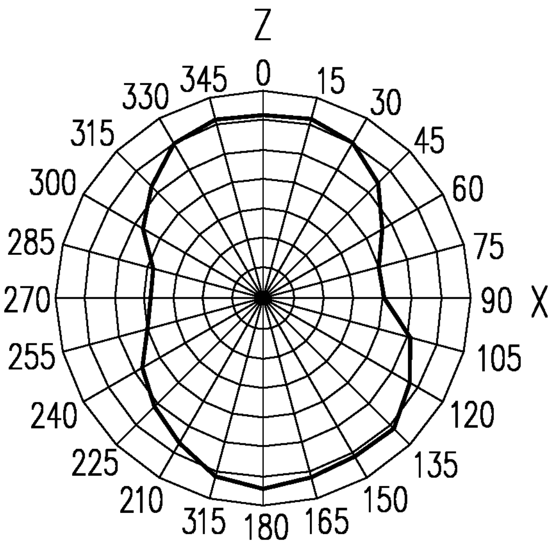

FIG. 8A to FIG. 8C are radiation pattern diagrams of a second antenna in FIG. 5 in different planes. Referring to FIG. 8A to FIG. 8C, in the two-dimensional radiation pattern of the ZY plane in FIG. 8B, the radiation energy EΦ-Eθ is directed toward 180 degrees. In the two-dimensional radiation pattern of the ZX plane in FIG. 8C, the radiation energy EΦ-Eθ is directed towards 180 degrees. Therefore, when the antenna device 100 is disposed on the ceiling, the user may get good communication quality under the ceiling.

In other words, no matter the angle of the external antenna 130 is adjusted to the first angle θ1 or the second angle θ2, the switch 160 switches to the first antenna 140 or the second antenna 150 to provide a proper radiation pattern and good communication quality. In addition, as can be seen from FIG. 7A to FIG. 8C, the first antenna 140 and the second antenna 150 also provide different radiation patterns, and the angle of the external antenna 130 may be adjusted by the user according to the needs to obtain good reception at the desired position.

To sum up, the external antenna of the antenna device of the disclosure may be externally connected to the body at an adjustable angle. The body includes a processor and a sensor electrically connected to the processor, and the processor is configured to receive a sensing signal from the sensor. The external antenna includes a first antenna, a second antenna, and a switch, and the switch is switchably electrically connected to the first antenna and the second antenna. The first antenna has a first radiation pattern, and the second antenna has a second radiation pattern. When the sensor senses that the external antenna is at a first angle relative to the body, the processor switches the switch electrically connected to the first antenna according to the sensing signal, so that the external antenna has the first radiation pattern. When the sensor senses that the external antenna is at a second angle relative to the body, the processor switches the switch electrically connected to the second antenna according to the sensing signal, so that the external antenna has the second radiation pattern. Since the external antenna of the antenna device of the disclosure switches to different antennas with the position relative to the body to provide different radiation patterns, the probability of dead spots in the reception may be effectively reduced and a better reception effect may be provided.

It will be apparent to those skilled in the art that various modifications and variations can be made to the disclosed embodiments without departing from the scope or spirit of the disclosure. In view of the forthcoming, it is intended that the disclosure covers modifications and variations provided that they fall within the scope of the following claims and their equivalents.

What is claimed is:

1. An antenna device comprising:

a body comprising a processor and a sensor electrically connected to the processor, the processor being configured to receive a sensing signal from the sensor; and at least one external antenna externally connected to the body at an adjustable angle, each external antenna comprising a first antenna, a second antenna, and a switch, the switch electrically connected to the processor and switchably electrically connected to the first antenna and the second antenna, the first antenna having a first radiation pattern, and the second antenna having a second radiation pattern, wherein when the sensor senses that the external antenna is at a first angle relative to the body, the processor switches the switch electrically connected to the first antenna according to the sensing signal, such that the external antenna has the first radiation pattern;

when the sensor senses that the external antenna is at a second angle relative to the body, the processor switches the switch electrically connected to the second antenna according to the sensing signal, such that the external antenna has the second radiation pattern.

2. The antenna device according to claim 1, wherein the body further comprises a sensing pad near the external antenna, the sensing pad is electrically connected to the sensor, the sensor is a capacitive proximity sensor, the sensing pad and the capacitive proximity sensor are configured to obtain a capacitive signal of the external antenna.

3. The antenna device according to claim 1, wherein a number of the external antenna is two, a number of the sensing pad is two, and the two sensing pads correspond to the two external antennas respectively to sense an angle of placement of the two external antennas relative to the body.

4. The antenna device according to claim 1, wherein the antenna device is adapted to be disposed on a ceiling, the first angle is an angle as the external antenna is perpendicular to a bottom surface of the body, and the second angle is an angle as the external antenna is parallel to the bottom surface of the body.

5. The antenna device according to claim 1, wherein when the external antenna is at the first angle relative to the body, the external antenna extends in a direction of gravity, and when the external antenna is at the second angle relative to the body, the external antenna extends in a horizontal direction perpendicular to the direction of gravity.

6. The antenna device according to claim 1, wherein the external antenna comprises a substrate, the substrate is disposed in the external antenna and the substrate is configured to dispose the first antenna, the second antenna, and the switch, the first antenna is a dipole antenna, the second antenna is a slot antenna, and the first radiation pattern of the first antenna is different from the second radiation pattern of the second antenna.

7. The antenna device according to claim 1, wherein the first antenna comprises a first radiator, a second radiator, and a first ground plane, the first ground plane comprises an edge and a notch recessed in the edge, the first radiator comprises a first section and a second section, the first section is located in the notch and comprises a first feed-in end, the second radiator is connected to the edge of the first ground plane, an angle between the second section and the second radiator is between 30 degrees and 60 degrees, and the first feed-in end is electrically connected to the switch.

8. The antenna device according to claim 7, wherein the angle between the second section and the second radiator is 45 degrees, and the first antenna is a 45-degree open-angle dipole antenna.

9. The antenna device according to claim 1, wherein the second antenna comprises a third radiator and a second ground plane that are not coplanar, the second ground plane comprises an internal hole, the third radiator comprises a second feed-in end, projection of the third radiator onto a plane of the second ground plane spans from the second ground plane to the internal hole, and the second feed-in end is electrically connected to the switch.

10. The antenna device according to claim 1, wherein the first antenna excites a frequency band, the second antenna excites the frequency band, and the frequency band is between 3.3 GHz and 3.8 GHz.

* * * * *